United States Patent
Fuchs et al.

(10) Patent No.: US 7,644,507 B2
(45) Date of Patent: Jan. 12, 2010

(54) METHOD FOR SCANNING A SURFACE WITH THE AID OF A COORDINATE MEASURING MACHINE AND COORDINATE MEASURING MACHINE

(75) Inventors: Andreas Fuchs, Aalen (DE); Jochen Burger, Heidenheim (DE); Hermann Deeg, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/189,252

(22) Filed: Aug. 11, 2008

(65) Prior Publication Data

US 2008/0307662 A1 Dec. 18, 2008

Related U.S. Application Data

(63) Continuation of application No. PCT/EP2007/003724, filed on Apr. 19, 2007.

(30) Foreign Application Priority Data

Apr. 24, 2006 (DE) ........................ 10 2006 019 382

(51) Int. Cl.
*G01B 5/004* (2006.01)
(52) U.S. Cl. .............................. 33/503; 33/556; 33/559
(58) Field of Classification Search ........... 33/503–505, 33/556, 559, 561
See application file for complete search history.

(56) References Cited

U.S. PATENT DOCUMENTS

| | | | |
|---|---|---|---|
| 4,769,763 A | | 9/1988 | Trieb et al. |
| 4,866,643 A * | | 9/1989 | Dutler .......................... 702/95 |
| 5,471,406 A * | | 11/1995 | Breyer et al. ................ 702/168 |
| 5,726,917 A * | | 3/1998 | Staaden ...................... 702/168 |
| 5,862,604 A * | | 1/1999 | Fuchs et al. .................... 33/503 |
| 5,895,444 A * | | 4/1999 | Ruck et al. ................. 702/168 |
| 6,154,713 A * | | 11/2000 | Peter et al. ..................... 702/95 |
| 6,434,846 B1 | | 8/2002 | McMurtry et al. |
| 7,142,999 B2 * | | 11/2006 | Grupp et al. .................. 702/95 |

(Continued)

FOREIGN PATENT DOCUMENTS

DE 35 23 188 A1 1/1987

(Continued)

*Primary Examiner*—G. Bradley Bennett
*Assistant Examiner*—Tania C Courson
(74) *Attorney, Agent, or Firm*—Laurence A. Greenberg; Werner H. Stemer; Ralph E. Locher

(57) ABSTRACT

A method for scanning a work piece surface uses a coordinate measurement device. A probe element is brought into contact with the surface and the probe element is moved along the surface. The coordinate measurement device has a plurality of degrees of freedom, which are independent of one another, in the possible movements of the probe element with respect to the work piece. Maximum speeds which describe the maximum of a movement speed component of the probe element based on the respective degree of freedom are defined for the degrees of freedom. An estimated path on which the probe element is intended to move during scanning is predefined. The actual scanning path can differ from the estimated scanning path. A maximum scanning speed at which the estimated scanning path can be traveled with a constant speed of the probe element is determined.

18 Claims, 7 Drawing Sheets

U.S. PATENT DOCUMENTS

2008/0189969 A1 * 8/2008 Fuchs et al. .................. 33/503

FOREIGN PATENT DOCUMENTS

| DE | 42 12 455 A1 | 10/1993 |
| DE | 195 29 547 A1 | 2/1997 |
| DE | 100 50 795 A1 | 7/2001 |
| DE | 10 2004 038 416 A1 | 2/2006 |
| DE | 10 2005 032 749 A1 | 1/2007 |
| WO | 00/62015 A1 | 10/2000 |
| WO | 2007/006448 A1 | 1/2007 |
| WO | 2007/122012 A1 | 11/2007 |

* cited by examiner

METHOD FOR SCANNING A SURFACE WITH THE AID OF A COORDINATE MEASURING MACHINE AND COORDINATE MEASURING MACHINE

CROSS-REFERENCE TO RELATED APPLICATION

This is a continuing application, under 35 U.S.C. § 120, of copending international application No. PCT/EP2007/003724, filed Apr. 19, 2007, which designated the United States; this application also claims the priority, under 35 U.S.C. § 119, of German patent application No. DE 10 2006 019 382.2, filed Apr. 24, 2006; the prior applications are herewith incorporated by reference in their entirety.

BACKGROUND OF THE INVENTION

The invention relates to a method for scanning a work piece surface with the aid of a coordinate measuring machine, and to a coordinate measuring machine that is configured, in particular to execute the method. The invention further contains a determining device for determining a value of a movement speed of the coordinate measuring machine.

Coordinate measuring machines are used to measure coordinates of surface points of a work piece. For example, a conventional coordinate measuring machine has a work piece holder for holding the work piece to be measured in a measurement position, and a probe element for scanning the surface of the work piece. In detail, the coordinate measuring machine can have a number of components that can be displaced relative to one another and of which at least one is permanently connected to the work piece holder, and of which at least one other carries the probe element, a plurality of drives for the components being provided in order to displace (that is to say, to move) the probe element relative to the work piece holder. The probe element is, for example, held by a measuring head. It can, furthermore, have a feeler. During scanning of the work piece surface, the probe element is brought into contact with the surface. Once contact has been produced between the probe element and the surface, it is possible to measure the coordinates of the point(s) with which the probe element (which is, for example, spherical) is in contact.

Scanning denotes a specific scanning mode in the case of which measurement points are continuously adopted in order, for example, to measure lines on the surface. During scanning, the probe element is moved on a scanning path, the probe element maintaining its contact with the surface of the work piece.

In particular, as is known from the prior art, in accordance with the present invention the scanning can be executed with the aid of a probe element that, for example, has a sphere that is guided along the surface of the object to be scanned. In this process, a deflection (with reference to the measuring head) of the sphere occurs from its zero or rest position. Moreover, the deflection gives rise to a restoring force that ensures the mechanical contact between the sphere and the object. At which location of the coordinate system the sphere touches the object is calculated from the instantaneous position of the probe element and from the deflection, which can be determined, in particular, with reference to the rest position of the sphere in all possible directions. The deflection is sensed via appropriate displacement sensors on the probe element.

The probe element is moved on the scanning path at a scanning speed. In principle, the scanning speed can vary, that is to say, accelerations and/or decelerations occur during the scanning movement. However, the speed changes can lead to vibrations of the overall system composed of the work piece and the coordinate measuring machine, thus producing measuring errors.

Because of the various drives, a coordinate measuring machine frequently has different maximum possible and/or maximum permissible speeds with reference to the individual degrees of freedom of the movement of the probe element. A degree of freedom of the movement is mostly understood as the possibility of movement on or parallel to a linear axis. For example, a coordinate measuring machine has three mutually independent linear degrees of freedom of the movement when the probe element can be moved in any desired directions at least within a specific measuring range. These three mutually independent linear axes are usually defined as the coordinate axes X, Y and Z of a Cartesian coordinate system. Since the probe element, or the point of the probe element, which comes into contact with the work piece surface can be assumed to be punctiform, and since the orientation of the probe element with reference to a coordinate system in which the work piece is at rest usually does not change during scanning, there is no need to consider further degrees of freedom of the movement, in particular rotary degrees of freedom. However, the invention is not limited to such coordinate measuring machines or measuring arrangements. In particular, the coordinate measuring machine can also have less than three mutually independent degrees of freedom of the movement, and/or at least one of the degrees of freedom can be a rotary degree of freedom, that is to say the probe element can, for example, be guided on a circular track by a rotation about a rotation axis of a drive.

SUMMARY OF THE INVENTION

It is accordingly an object of the invention to provide a method for scanning a surface with an aid of a coordinate measuring machine and a coordinate measuring machine which overcome the above-mentioned disadvantages of the prior art methods and devices of this general type, which permit the measuring period during scanning to be kept as short as possible. The aim in this case is to prevent measuring errors and to take account of measuring arrangements in the case of which the coordinate measuring machine or the probe element has various maximum speed magnitudes with reference to various degrees of freedom of the movement. A maximum speed magnitude of a degree of freedom is understood to mean that in the case of a movement exclusively in the direction defined by the degree of freedom the associated maximum speed magnitude may not or cannot be exceeded.

A basic idea of the invention consists in taking account of the scanning path respectively to be traversed by the probe element in order to determine which constant, maximum permissible magnitude of the scanning speed the probe element is permitted to have, the maximum speed magnitudes for the individual degrees of freedom of the movement being capable of differing. This is based on the finding that depending on position and orientation of the scanning path, different maximum magnitudes of the scanning speed can result in the measuring arrangement for the same shape of the scanning path. In other words, if the maximum speed magnitude for a specific degree of freedom is smaller than the maximum speed magnitudes for the other degree(s) of freedom, what is important is whether points or line segments at or along which the scanning path largely or exclusively runs in the movement direction defined by the specific degree of freedom lie on the scanning path. If this is the case, it will limit the maximum magnitude of the scanning speed more strongly toward lower values than in other instances. The relationships become even more complex in this case when different maximum speed magnitudes are defined for all degrees of freedom of the movement.

Moreover, for specific measuring ranges, that is to say ranges of the measuring arrangement in which the probe element is located, it is also possible to define different maximum speed magnitudes for the same degree of freedom. A possible reason for this is, for example, the presence of a safety zone in which the movement of the probe element is more strongly limited than in other zones.

In particular, a method is proposed for scanning a work piece surface of a coordinate measuring machine:
  in which a probe element of the coordinate measuring machine is brought into contact with the surface, and the probe element is moved along the surface while contact is maintained (scanning),
  in which the coordinate measuring machine has a plurality of mutually independent degrees of freedom, for example, degrees of freedom of linear axes, of the possible movements of the probe element with reference to the work piece, and in which there are defined for the degrees of freedom maximum speed magnitudes that describe the maximum of a movement speed component of the probe element referred to the respective degree of freedom,
  in which for a planned scanning of the work piece there is, or has been, prescribed, an estimated path (scanning path) on which the probe element is to move during scanning, and in which the actual scanning path can differ from the estimated scanning path as a function of actual measurements of the work piece, and
  in which by taking account of the maximum speed magnitudes for the various degrees of freedom, a maximum magnitude of the scanning speed is determined at which the estimated scanning path can be traversed at a constant magnitude of the speed of the probe element.

The inventive method has the advantage that it is not the degree of freedom with the lowest maximum speed magnitude that automatically determines the maximum magnitude of the scanning speed. Rather, it can be determined for a specifically prescribed estimated scanning path whether a higher scanning speed is possible and whether the magnitude of the scanning speed can nevertheless be kept constant over the entire scanning path. Moreover, it is possible to select another scanning path or (for example, by changed orientation and/or positioning of the work piece relative to the coordinate measuring machine) to arrange a scanning path of given shape in a different way in the measuring range. The maximum magnitude of the scanning speed can be higher in the case of this other arrangement. In particular, it is possible on the basis of the results of the inventive method for a given shape of a scanning path to arrange the scanning path such that the highest possible maximum magnitude of the scanning speed is attained for all possible arrangements. This is of particular advantage especially when identically configured work pieces are to be measured by the coordinate measuring machine over and over in the course of mass production of work pieces.

Even if the maximum magnitude of the scanning speed is determined as the result of the inventive method, the probe element nevertheless can be moved during scanning at a lower constant magnitude of the speed. A possible reason for this is that, for example, a speed reserve of 10% is to be maintained, that is to say it is to be possible to raise the speed by 10%, without exceeding the maximum magnitude of the scanning speed.

In particular, at least one of the degrees of freedom can be a degree of freedom of a linear axis of the coordinate measuring machine. In this case, it is possible in a preferred embodiment of the method to take account of all points on the estimated scanning path that have a local maximum of the (partial) derivative of the magnitude of a coordinate with respect to the path (these points being denoted below as extreme points), in which the coordinate is a spatial coordinate that is defined with reference to a coordinate axis that is the linear axis or that runs parallel to the linear axis, and in which the maximum magnitude of the scanning speed is fixed such that the magnitude of the speed component with reference to the coordinate axis does not exceed the maximum speed magnitude of the degree of freedom at any of the extreme points determined. A determination of the spatial coordinates of the extreme points is not mandatory. Rather, the extreme points or information derived therefrom can also be determined indirectly.

It is understood by a local maximum that upstream and downstream of the extreme point there are other points lying on the scanning path that have a smaller derivative of the magnitude of the coordinate with respect to the path. It is generally possible here that the same point on the path is an extreme point with reference to more than one degree of freedom. Again, for example, all points over a segment of the scanning path can be extreme points with reference to a degree of freedom when the segment is rectilinear, for example. An exception is formed by the situation in which the start point or the end point of the scanning path is being considered. In this case, it is sufficient for a local maximum of the derivative if the derivative of the magnitude of the coordinate with respect to the path is smaller in the further course of the path or in the course upstream of the end point.

The coordinate is a spatial coordinate that is defined with reference to a coordinate axis that is the linear axis or that runs parallel to the linear axis. In this preferred embodiment of the method, the maximum magnitude of the scanning speed is fixed such that the magnitude of the speed component with reference to the coordinate axis does not exceed the maximum speed magnitude of the degree of freedom at any of the extreme points determined.

Extreme points are preferably respectively determined separately for all degrees of freedom of the coordinate measuring machine, and the maximum magnitude of the scanning speed is fixed such that the respective magnitude of the speed component with reference to the respective coordinate axis does not exceed the maximum speed magnitude of the respective degree of freedom at any of the extreme points determined.

The preferred embodiment is based on the idea that it is necessary to consider only the extreme points for fixing or determining the maximum magnitude of the scanning speed. In this case, even the evaluation of a portion of the extreme points can suffice, for example, when the scanning path is a circular track. Thus, it is unnecessary, in particular, to evaluate the speed components (the term "component" relates to an assigned coordinate axis) for each point on the scanning path as to whether the speed component is greater than the maximum speed magnitude of the associated degree of freedom or the associated coordinate axis. It is possible for this reason to make substantial savings on computational outlay, and forward planning of the measurement of a work piece can be carried out in an acceptable time.

Such a part of the method whose content is calculation of the maximum magnitude of the scanning speed can, in particular, be executed automatically by an arithmetic logic unit that can, for example, be part of a control device for controlling the operation of the coordinate measuring machine and/or can be connected to the control device. The arithmetic logic unit, which is a microcomputer, for example, it being possible for the appropriate computing algorithm to be implemented in hardware and/or software, is assigned, for example, an interface via which the arithmetic logic unit can input data that describe the estimated scanning path.

The invention likewise covers a coordinate measuring machine that is, in particular, capable of executing the method in one of the refinements that are described in this description. In particular, the coordinate measuring machine can have the control device and/or the arithmetic logic unit mentioned.

When determining the abovementioned extreme points, it is advantageous when the estimated scanning path has a round profile, in particular being in the shape of a circular arc, a helix, a spiral or an ellipse, or being oval. In the case of the particular shapes listed for a round profile, it cannot happen that an entire segment of the scanning path consists of extreme points, except when a coordinate does not change at all along the round profile, and can therefore remain out of consideration for calculating the maximum magnitude of the scanning speed. The latter applies, for example, whenever in the case of a circular scanning path, the coordinate to be left out of account is defined with reference to a coordinate axis that is perpendicular to the plane of the circle. Furthermore, particularly in the case of a profile in the shape of a circular arc or helix, it cannot occur that the same point is an extreme point with reference to different, mutually independent degrees of freedom. The extreme points can therefore in each case be considered separately for determining the maximum possible speed component with reference to the degree of freedom, for which the local maximum of the derivative of the magnitude of the coordinate with respect to the path was determined.

Scanning paths in the shape of a circular arc (or circle) and of a helix occur frequently in practice, for example, when measuring work pieces that have the shape of circular plates, rings, cones or cylinders. Particular exemplary embodiments remain to be examined for this purpose in the description of the figures.

When determining the maximum magnitude of the scanning speed, in particular, in order to take account of the extreme points, it is possible to calculate a tangent of the estimated scanning path that runs parallel to the linear axis. In other words, a straight line (the tangent) touches the scanning path (when at least only a local region is considered) at only one point, specifically the extreme point, that is to be taken into account. Here, as mentioned, the tangent is parallel to the linear axis or the coordinate axis of the coordinate whose maximum of the derivative of the magnitude of the coordinate is to be found with respect to the path. In specific cases, such as, for example, that of a circular track, the extreme points can be determined particularly easily by determining the point with the greatest distance and the point with the least distance from the respective coordinate axis.

However, the extreme points (given a case in which there is or has been defined for the round profile of the scanning path a rectilinear axis that is a rotational symmetry axis profile or a rotational symmetry axis of a projection of the profile onto a plane perpendicular to the symmetry axis) are preferably taken into account by forming the cross product of a vector in the direction of the rotational symmetry axis with a vector in the direction of the linear axis. The vector in the direction of the rotational symmetry axis is denoted below as symmetry axis sector. The vector in the direction of the linear axis is denoted below as linear axis vector. The result vector obtained from the cross product of the symmetry axis vector and the linear axis vector is used to take account of the points on the scanning path to which the result vector points if it applies the axis to arbitrary points of the rotational symmetry. "Apply" is understood to mean that the start of the result vector lies on the rotational symmetry axis. The result vector is therefore in this case not a spatial vector to be applied to the origin of the coordinate system, but a difference vector. Saying that the result vector "points" to the extreme point is understood to mean that a straight line on which the result vector runs when it is applied to the rotational symmetry axis cuts the extreme point.

For each application point on the rotational symmetry axis to which the result vector is applied and for which there is any extreme point at all, there can also be a second extreme point, depending on the shape of the scanning path. This is the case, in particular, for an oval and for a circular scanning path. Moreover, the same result vector can be used (in the case of a scanning path in the shape of a helix, for example) to determine different extreme points, although in this case, the application points on the rotational symmetry axis are different. In the case of the helix, the different application points lie on the rotational symmetry axis in a fashion offset by half the pitch of the helix.

The extreme points are preferably taken into account for all degrees of freedom, there respectively being formed for each of the extreme points (at least of a portion of the scanning path, for example, of a pitch of a helix) a tangent vector that runs in the direction of a tangent at the extreme point, and in which in each case only the component of the tangent vector is used to calculate the maximum magnitude of the scanning speed which is defined with reference to the degree of freedom, for which the extreme point was determined. This component is denoted below as "evaluation component". The direction of the tangent vector, that is to say the ratio of its components, is decisive in this case for the evaluation. This tangent vector runs in the direction of the speed of the probe element during the scanning (the scanning speed). Since there can be different tangents at the same point on the path, this tangent vector can also be denoted as speed tangent vector. Its determination is a function of the geometry of the scanning path. Examples of the calculation of the speed tangent vector are still to be examined for particular geometries.

The evaluation of the extreme points and the determination of the maximum magnitude of the scanning speed using the method for calculating the speed tangent vector are very easy. If the component is, for example, the X component of a Cartesian coordinate system, use is then made only of the X component of the tangent vector as evaluation component for an extreme point for which the derivative of the magnitude of the X-coordinate with respect to the scanning path is a maximum.

The following preferred refinements relate to the determination of the maximum magnitude of the scanning speed on the basis of the tangent vectors formed.

All tangent vectors are preferably normalized to an equal magnitude, and the maximum magnitude of the scanning speed is determined from the evaluation components. During the normalization of the tangent vectors, account is taken of the boundary conditions of the calculation, in accordance with which the scanning speed is to be constant over the entire scanning path. In other words, the normalization produces the correct relationship between the evaluation components without already fixing the scaling (that is to say the magnitude) of the tangent vector and/or of the speed vector.

Preferably, it is determined from the evaluation components of the normalized tangent vectors and from the maximum speed magnitudes for the respectively assigned degrees of freedom which of the maximum speed magnitudes of the degrees of freedom limits the maximum magnitude of the scanning speed. This includes the case when a combination of the maximum speed magnitudes of different degrees of freedom limits the maximum magnitude of the scanning speed. For example, in a simple case all tangent vectors respectively have only one component that vanishes, specifically the respective evaluation component. This is the case, for example, whenever the scanning path is a circular track and lies in a plane that is defined by two Cartesian coordinate axes. In this case, the maximum magnitude of the scanning speed is limited by that evaluation component which is defined with reference to the coordinate axis by the lower maximum speed magnitude. If the (normalized) tangent vectors have two or more components which do not vanish, however, the components of the respective tangent vector that are not the evaluation components also contribute indirectly to limiting the maximum scanning speed. However, because of the normalization, the limitation effected by the other components is expressed in the magnitude of the evaluation component, and only the evaluation component need be considered for each of the tangent vectors.

Moreover, however, the respective maximum speed magnitude for the respectively assigned degree of freedom of the evaluation component is to be taken into account for determining the maximum magnitude of the scanning speed. By way of example, if on the one hand the evaluation component for exclusively one of the tangent vectors is relatively large (this can be denoted as a high degree of utilization), while on the other hand the maximum speed magnitude of the assigned degree of freedom is relatively small, this evaluation component can then limit the maximum magnitude of the scanning speed on its own. In other words, the scanning speed for the overall scanning path is limited at the path point of the tangent vector with the limiting pair, which consists of the evaluation component and of the maximum speed magnitude for the assigned degree of freedom. The limiting pair consisting of evaluation component and maximum speed magnitude for the assigned degree of freedom, can, for example, be determined by forming this pair for each of the tangent vectors, in particular by calculating (dividing) the maximum speed magnitude for the degree of freedom divided by the evaluation component, and by subsequently comparing the division results for all tangent vectors. The lowest division result belongs to the limiting pair. If the tangent vectors are preferably normalized to the magnitude one, the division result for the limiting pair is directly equal to the maximum magnitude of the scanning speed.

Other features which are considered as characteristic for the invention are set forth in the appended claims.

Although the invention is illustrated and described herein as embodied in a method for scanning a surface with the aid of a coordinate measuring machine and a coordinate measuring machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
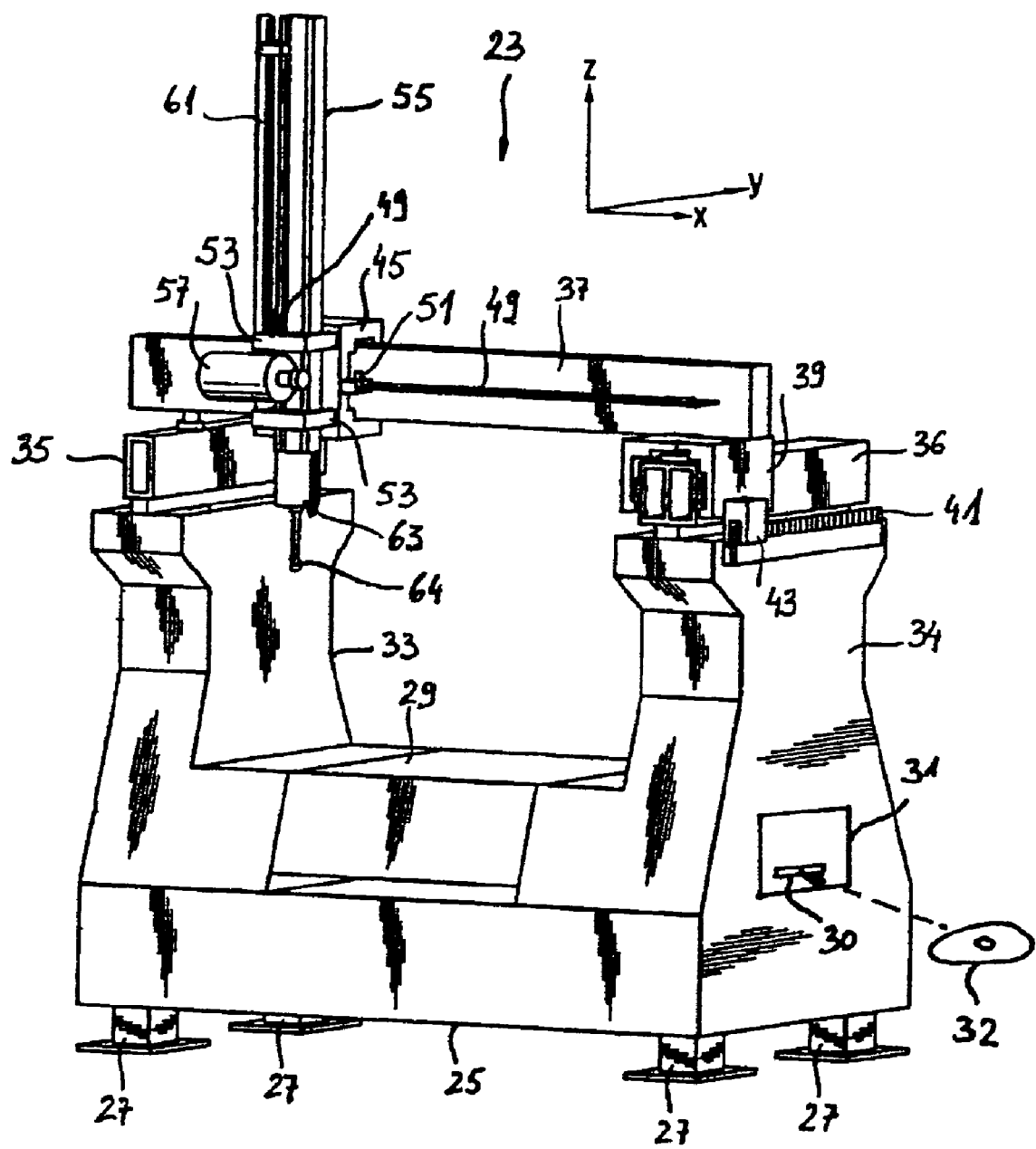
FIG. 1 is a diagrammatic, perspective view of a particularly preferred embodiment of a coordinate measuring machine according to the invention.

Referring now to the figures of the drawing in detail and first, particularly, to FIG. 1 thereof, there is shown an embodiment of an inventive coordinate measuring machine on an example of a coordinate measuring machine 23 of a gantry configuration.

The coordinate measuring machine has a base 25 with feet 27. In its middle, the base 25 has a work piece holder or work piece support 29 on which a work piece to be measured is to be arranged. Extending upward on either side of the work piece holder 29 on the base 25 are struts 33, 34 that carry longitudinal guides 35, 36 that are arranged on either side of the work piece holder 29 and extend parallel to one another in a horizontal direction (the Y-direction). Extending horizontally in a fashion orthogonal to the longitudinal guides 35, 36 is a transverse guide 37 in the X direction that is mounted on the longitudinal guides 35, 36 such that it can be displaced linearly in the Y direction. For this purpose, there is provided on one end of the transverse guide 37 a guide section 39 that grips the longitudinal guide 36 from above in a U-shaped fashion and is guided thereon by air cushions, for example. At its other end, the transverse guide 37 is supported on the top side of the longitudinal guide 35 and is also mounted such that it can be displaced relative to the longitudinal guide in the Y direction. The transverse guide 37 can be displaced along the longitudinal guide 36 by a motor drive that is controlled by a controller 31, corresponding displacement position in the Y direction being sensed by a measuring system that has a scale 41 fixed on the base, and an associated sensor 43, fixed on the U-section 39, for reading off the scale 41.

A guide section 45 is mounted on the transverse guide 37 such that it can be displaced linearly in the X direction, the displacement position in the X direction likewise being sensed by a measuring system that for this purpose has a scale 49 fitted to the transverse guide 37 and an associated sensor 51 made fast on the guide section 45. In FIG. 1, the controller 31 controls a non-illustrated drive that changes the displacement position of the guide section 45 along the transverse guide 37.

Provided on the guide section 45 are two further guide sections 53, which are arranged at a distance from one another and serve to mount a bar 55 that extends in the Z direction and can be displaced via a motor 57 likewise controlled by the controller 31. The displacement position of the bar 55 in the Z direction is sensed via a sensor 49 that is provided on the vertical guide 53 and reads off the position on a scale 61 fixed on the bar 55. A measuring head system 63 is held on a quill provided at a lower end of the bar 55. The measuring head system contains a measuring head extension and/or a measuring head changing system in order to couple the actual measuring head to the quill. A system is, in turn, coupled to the measuring head, it being possible to couple a probe system, measuring head rigidly. It is also possible to provide a probe changing system in order to couple different exchangeable probe systems to the measuring head. A probe system can contain a probe extension that continues in a probe shaft at whose end there is fitted the probe element 64 that can be brought into contact with the work piece surface in order to measure the latter. The probe element 64 can be a ruby sphere, for example. The probe system 64 can also contain a number of probes that, for example, extend transverse to one another on a probe extension in order to scan surfaces of the work piece that are oriented in different directions. It is also possible to provide a rotating and swinging system in the quill and the measuring head or a measuring head changing system or an inserted measuring head extension in order to change an orientation of the measuring head with reference to the quill such that it is also possible to change an orientation of the probe in space in order to scan surfaces of work pieces that are oriented in different directions.

Via the drives, the controller 31 controls the position of the probe element 64 relative to the work piece holder 29, it registers a contact between the probe element 64 and the surface of the work piece and it reads out the measuring systems of the coordinate measuring machine 23 in order to measure as exactly as possible the coordinates of the position of the probe element 64 relative to the work piece holder 29. The controller 31 is illustrated merely schematically in FIG. 1. It can be configured as a computer that has interfaces for the purpose of accepting user commands to activate the drives, to read out the measuring systems, and the like. The computer executes the provided operations in accordance with a program that can be loaded into the computer in various ways. Illustrated schematically in FIG. 1 is a compact disk ROM 32 that carries the program information in computer-readable form and can be inserted into a slot 30 in the controller 31 in order to load the program into the computer. The program information can, however, also be loaded into the controller 31 in a different way such as, for example, via a computer network.

Figure 2:
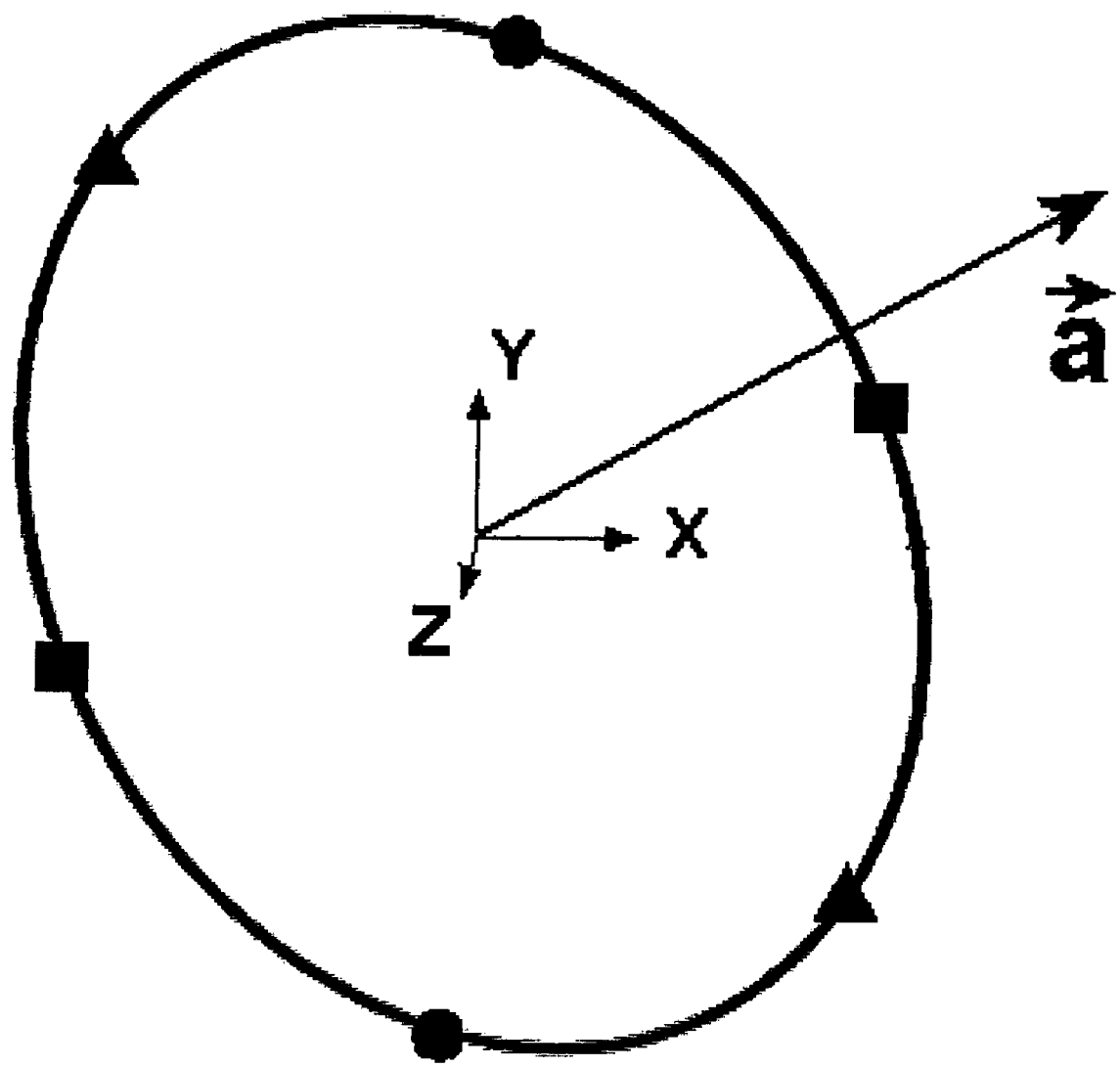
FIG. 2 is a schematic of a scanning path configured as a circular track, extreme points that are used to calculate the maximum magnitude of the scanning speed being marked.

With reference to FIG. 2, a calculation of the magnitude of the maximum permissible scanning speed (maximum scanning speed below, for short) is now derived for a simple application in which the scanning path is a circular track. However, general aspects of the inventive method are also examined when describing this exemplary embodiment.

As already mentioned, the calculation is subject to the condition that the magnitude of the work piece scanning speed is constant during execution of the work piece scanning more particularly in the case of the circular track. The fact that the maximum possible and/or permissible scanning speed is to be calculated leads to the requirement that the maximum of the associated movement speed component is to be utilized as much as possible for each degree of freedom of the movement of the probe element.

In the following exemplary embodiment, the coordinate measuring machine has three mutually independent linear degrees of freedom of the movement, the degrees of freedom corresponding to the three coordinate axes X, Y, Z of a Cartesian coordinate system of the measuring arrangement. When calculating the maximum scanning speed, use is made inter alia of the symbols introduced in Table 1.

TABLE 1

Symbols used

| Symbol | Description | Example |
|---|---|---|
| I | Reference index (designates the reference of an arbitrary vector $\vec{a}$ to a coordinate acis I, where I:X, Y, Z) | $\vec{a}_I$, or in particular for the X-axis: $\vec{a}X$ |
| k | Index of the vector component (designates the component of an arbitrary vector $\vec{a}$) | $\vec{a} = \begin{pmatrix} a_x \\ a_y \\ a_z \end{pmatrix}$ k:x, y, z |
| $\vec{vMax}$ | Maximum speed of the coordinate measuring machine | $\vec{vMax} = \begin{pmatrix} vMax_x \\ vMax_y \\ vMax_z \end{pmatrix}$ |

On a scanning path there can be points (termed extreme points below, "extreme" relating to the speed) at which the maximum possible magnitude of the speed of the movement axes is respectively active. That is to say, extreme points are scanning points at which the movement speed of the probe element in one of the three coordinate axes is greatest.

Figure 3:
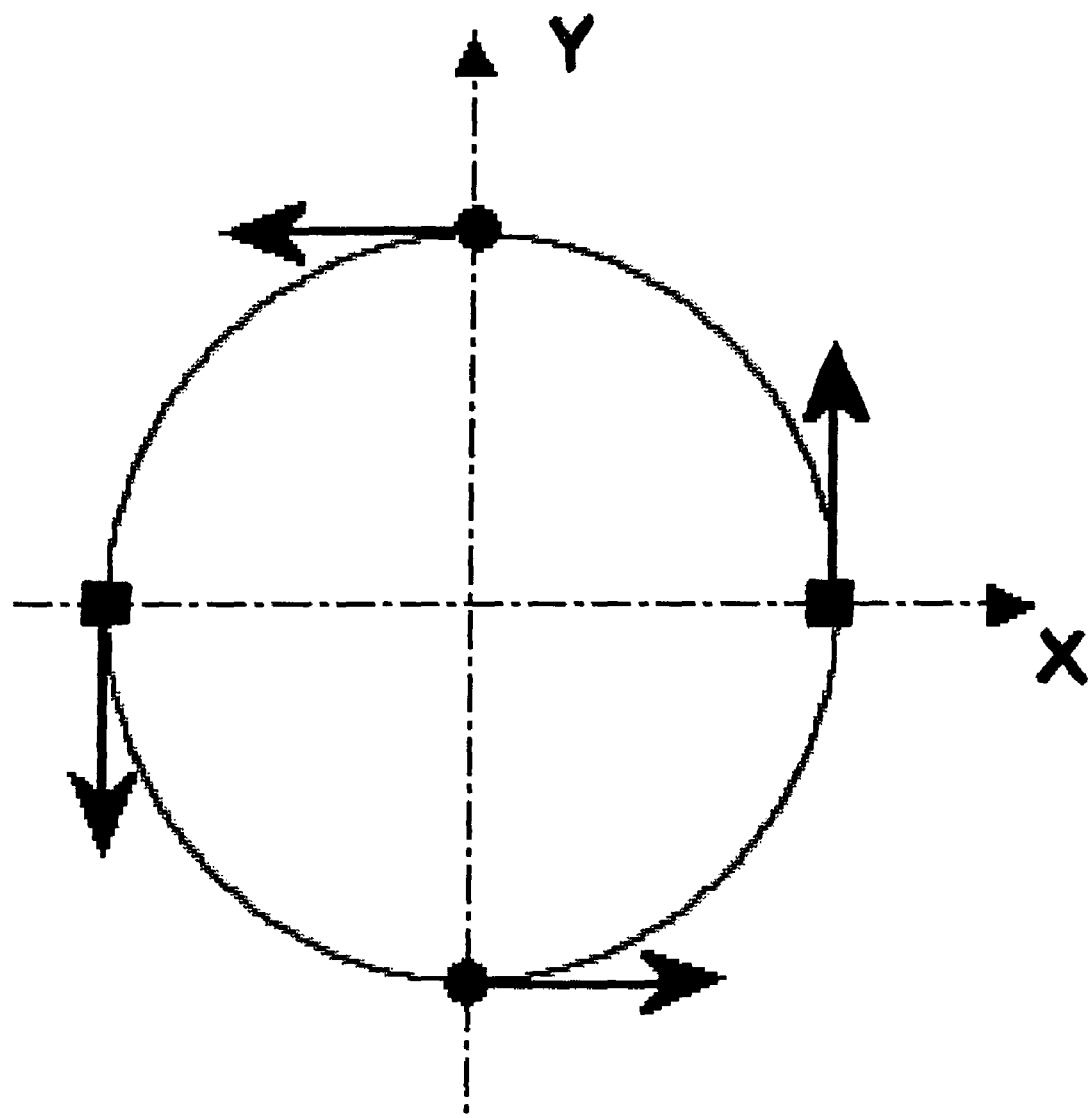
FIG. 3 is an illustration showing, in turn, a scanning path that is configured as a circular track but lies in a plane defined by only two coordinate axes.

There are at least four such extreme points in the case of a circular track (when the circular track lies in the plane defined by two of the coordinate axes), see FIG. 3. However, generally there are six such extreme points for a circular track, see FIG. 2.

In the example in accordance with FIG. 3, the circular track lies in the XY plane. In FIG. 3, the extreme points of the circular track with reference to the X-axis are illustrated above and below (as small circles) and the extreme points of the circular track with reference to the Y-axis are illustrated to the right and left (as small squares). Moreover, in each case an arrow illustrates the direction of the track speed at the extreme point during scanning. Since the circular track lies in the XY plane in this example in accordance with FIG. 3, there are no extreme points with reference to the Z-direction.

However, if the circular track does not lie in a plane that is defined solely by two of the coordinate axes, extreme points also exist with reference to the third direction, here the Z-direction. This case is illustrated in FIG. 2. In FIG. 2, the extreme points of the circular track with reference to the X-axis are illustrated above and below (as small circles), the extreme points of the circular track with reference to the Y-axis are illustrated top right and bottom left (as small squares) and the extreme points of the circular track with reference to the Z-axis are illustrated bottom right and top left (as small triangles). Moreover, the coordinate axes X, Y, Z of the Cartesian coordinate system are illustrated and these are the same as the movement axes of the coordinate measuring machine.

In the case of a circle, two extreme points that are referred to the same coordinate axis behave identically. That is to say the directions of the scanning speeds at the two extreme points are then opposite to one another. The speed vectors are antiparallel. Consequently, only one extreme point need be considered per axis, for example, by solely considering the magnitudes of the speed components.

A particularly preferred embodiment of the inventive method is described below with reference to the exemplary embodiment with the circular track. The basic idea of this embodiment resides in the simple calculation of the extreme points and in the simple determination of the maximum scanning speed by use of vector operations and the evaluation of the decisive vector components.

The unit vectors (that is to say the magnitude of the vectors is equal to one) $\vec{eX}$ $\vec{eY}$ $\vec{eZ}$ are defined as those unit vectors that run in the direction of the coordinate axes X, Y, Z, or in other words: that define the Cartesian coordinate system. It is possible to define for the circular track and for other scanning paths with a rotational symmetry axis a vector that runs in the direction of the symmetry axis and is denoted below for short by the axis vector $\bar{a}$.

The extreme points can be calculated simply in the way described below with the aid of these three unit vectors.

The unit vectors are:

$$\vec{eX} = (1\ 0\ 0)$$

$$\vec{eY} = (0\ 1\ 0)$$

$$\vec{eZ} = (0\ 0\ 1)$$

The axis vector $\bar{a}$ is preferably normalized, that is to say $|\bar{a}|=1$.

The cross product (also denoted as vector product in the literature) between the unit vectors and the axis vector $\bar{a}$ is used to calculate the vectors $\vec{rI}$, that point in the direction of the extreme points $\vec{pI}$, when they are applied as difference vector to the symmetry axis. The following equation [1] reproduces the cross product:

$$\vec{rI} = \vec{eI} \times \bar{a} \qquad [1]$$

It therefore holds for each coordinate axis (the respective index X, Y, Z is inserted for I in equation [1]) that:

$$\vec{rX} = \bar{a} \times \vec{eX}$$

$$\vec{rY} = \bar{a} \times \vec{eY}$$

$$\vec{rZ} = \bar{a} \times \vec{eZ}$$

The directions in which the extreme points lie from the point of view of the symmetry axis are therefore known. Looking further than the particular exemplary embodiment of the circular track, in general it can happen that more than one point of intersection with the scanning track lies in the direction of one or more of the vectors $\vec{rI}$, particularly even if the opposite direction is considered.

If the cross product between a unit vector and the axis vector $\bar{a}$ vanishes, all points on the circular track to be measured then constitute extreme points that, however, need not be taken into account for the further evaluation. In this case, specifically, the entire scanning path is located in a plane in which the unit vector is perpendicular. By way of example, this is the unit vector $\vec{eZ}$ for the case illustrated in FIG. 3. In a more general formulation, the result is:

$$\vec{eI} \times \bar{a} = \vec{0}\ (\bar{a}\ \text{parellel}\ \vec{eI})$$

that is to say the axis vector $\bar{a}$ runs parallel to the unit vector $\vec{eI}$.

As an alternative to checking whether the cross product vanishes for one of the unit vectors, it is possible to calculate the scalar product between the unit vectors $\vec{eI}$ and the axis vector $\bar{a}$. If the magnitude of the scalar product is 1, this is also an indication that the scanning path, here the circular track, for example, is located in one of the coordinate system planes (plane XY, plane XZ or plane YZ).

$$|\vec{eI} \cdot \bar{a}| = 1\ (\bar{a}\ \text{parallel}\ \vec{eI})$$

In the case of the circular track, the two direction vectors $\vec{rI}$, that are referred to the other coordinate axes and point from the point of view of the symmetry axis to the extreme points, can then be used to calculate the two unit vectors $\vec{eI}$ that are perpendicular to the axis vector $\bar{a}$, for example:

$$\vec{eX} \times \bar{a} = \vec{0} \Rightarrow \vec{rX} = \vec{eY}\ \text{or}\ \vec{rX} = \vec{eZ}$$

In the case of the circular track, the extreme points $\vec{pI}$ can be calculated by multiplying the vector $\vec{rI}$ by the radius D/2 of the circle. However, this multiplication is not required for calculating the maximum scanning speed of the circular track:

$$\vec{pI} = \vec{rI} \cdot D/2 \qquad [2].$$

The cross product between the axis vector $\bar{a}$ and the vectors $\vec{rI}$ calculated in equation [1] yields, inter alia, the direction of the scanning speed at the respective extreme point, $$\vec{tI} = \bar{a} \times \vec{rI} \qquad [3].$$

It therefore holds for each axis that:

$$\vec{tX} = \bar{a} \times \vec{rX}$$

$$\vec{tY} = \bar{a} \times \vec{rY}$$

$$\vec{tZ} = \bar{a} \times \vec{rZ}$$

In the case of the circular track, these vectors $\vec{tI}$ are tangent vectors on the scanning path and thus speed vectors, the scaling of the speed not yet having been carried out, however. In other cases, for example, the case described below of a scanning path in the shape of a helix, there can be other ways of determining the tangent vectors at the extreme points. The evaluation of the tangent vectors can, however, be carried out as follows in all cases.

Figure 4:
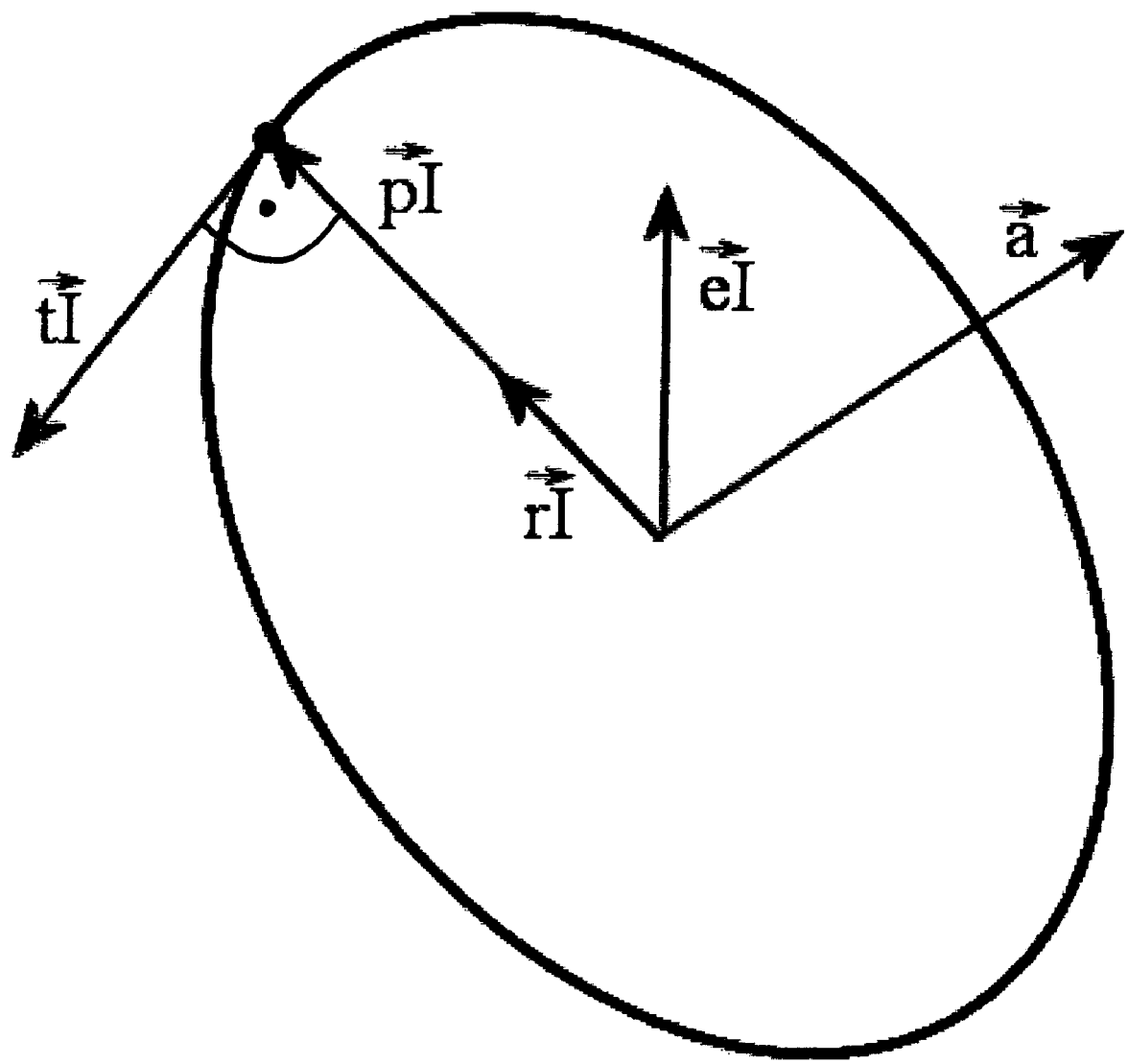
FIG. 4 is an illustration showing a circular track in accordance with FIG. 2 with a schematic illustration of vectors that are used for the further calculation of the maximum scanning speed.

FIG. 4 shows an illustration for the case of the circular track, in which there are to be seen the axis vector $\bar{a}$ perpendicular to the plane of the circular track, the unit vector $\vec{eI}$ for the calculation of an extreme point, the direction vector $\vec{rI}$ obtained by forming the cross product between the axis vector $\bar{a}$ and the unit vector $\vec{eI}$, the vector $\vec{pI}$ that is collinear with this direction vector $\vec{rI}$ and actually points from the symmetry axis to the calculated extreme point, and the tangent vector $\vec{tI}$. The right angle between the vector $\vec{pI}$ and the tangent vector $\vec{tI}$ is likewise illustrated.

The maximum scanning speed is now determined below from the determined tangent vectors $\vec{tI}$.

To this end, the components $\vec{tI}_k$ of the vector $\vec{tI}$ are considered individually:

$$\vec{tI}_k : \vec{tX} = \begin{pmatrix} tX_x \\ tX_y \\ tX_z \end{pmatrix}; \vec{tY} = \begin{pmatrix} tY_x \\ tY_y \\ tY_z \end{pmatrix}; \vec{tZ} = \begin{pmatrix} tZ_x \\ tZ_y \\ tZ_y \end{pmatrix}$$

The components $\vec{tI}_k$ of the tangent vector $\vec{tI}$ supply for the respective axis I, a substantial amount of information relating to the maximum scanning speed when all tangent vectors are normalized to the same magnitude. This is the case in the above exemplary embodiment, since both the axis vector $\bar{a}$ and the vector $\vec{rI}$ are vectors of magnitude one, and their cross product therefore also has the magnitude one.

The components $\vec{tI}_k$ of the tangent vector $\vec{tI}$ supply the so-called degree of utilization $\eta I_k$ of the axis speeds vMax$_k$, that is to say of the maximum speed magnitudes of the respectively assigned degree of freedom. The degree of utilization $\eta I_k$ can be understood as the degree by which the component $\vec{tI}_k$ approaches the magnitude of the vector (here one). If the other two speed components vanish at the extreme point (as in the exemplary embodiment in accordance with FIG. 3), the degree of utilization is then equal to one. If, by contrast, not both of the other speed components vanish at the extreme point (as in the exemplary embodiment in accordance with FIG. 2), the degree of utilization is then lower. Consequently (if only this one extreme point were to be considered), the scanning speed could be higher overall at the extreme point, since in addition to the speed component $\vec{tI}_k$ the two other speed components also contribute to the scanning speed.

Only the magnitude of the speed component $\vec{tI}_k$ features in the calculation, since the speed on the axes can also assume negative values (the direction of the movement along the coordinate axis can be reversed).

Since tI represents the speed vector for an extreme point with reference to the axis I, only the component for which the following condition holds:

$$\eta I_k = |tI_k| \text{ für } I = k \qquad [4]$$

is required for determining the degree of utilization $nI_R$. Furthermore, the determination of the maximum scanning speed requires only the largest (according to magnitude) component $\vec{tI}_k$ of all tangent vectors tI that have been obtained as tangent vectors at extreme points with reference to the same axis. In other words: only the greatest degree of utilization among the tangent vectors of the same axis is decisive, since the speed at all points with the lower degree of utilization is limited less strongly by the component $\vec{tI}_k$.

Consequently, only one maximum degree of utilization holds for each axis:

$\eta X_x = |tX_x|$ $\eta Y_y = |tY_y|$ $\eta Z_z = |tZ_z|$

Since the vector $\vec{tY}$ is the direction of the V scan track at the extreme point of the Y-axis, the component $tY_y$ describes the maximum value for the Y-axis on the entire circular scanning track.

The maximum scanning speed vScanMax$_k$ on the axis is calculated in the preferred exemplary embodiments by multiplying for each axis the reciprocal of the maximum degree of utilization $\eta I_k$ by the maximum permissible axial speed vMax$_k$ of the coordinate measuring machine or the probe element. Any possible different speeds on the axes are taken into account by the multiplication of the axial speed.

$$vScanMax_k = \frac{1}{\eta I_k} vMax_k \qquad [5]$$

$$f\ddot{u}r\, I = k$$

The minimum is now determined from the three calculated values vScanMax$_k$. This is necessary since the speed at the extreme point with the lowest speed magnitude limits the scanning speed vScanBahn of the scanning path.

$$vScanBahn = \min(vScanMax_x, vScanMax_y, vScanMax_z) \qquad [6]$$

The application of a circular track has previously been examined on various occasions. A further case frequently occurring in practice is examined below, specifically the scanning path in the shape of a helix. This case occurs, in particular, when a cylindrical surface is scanned. Only differences and particular features relating to the previously described embodiment are examined below.

Figure 5:
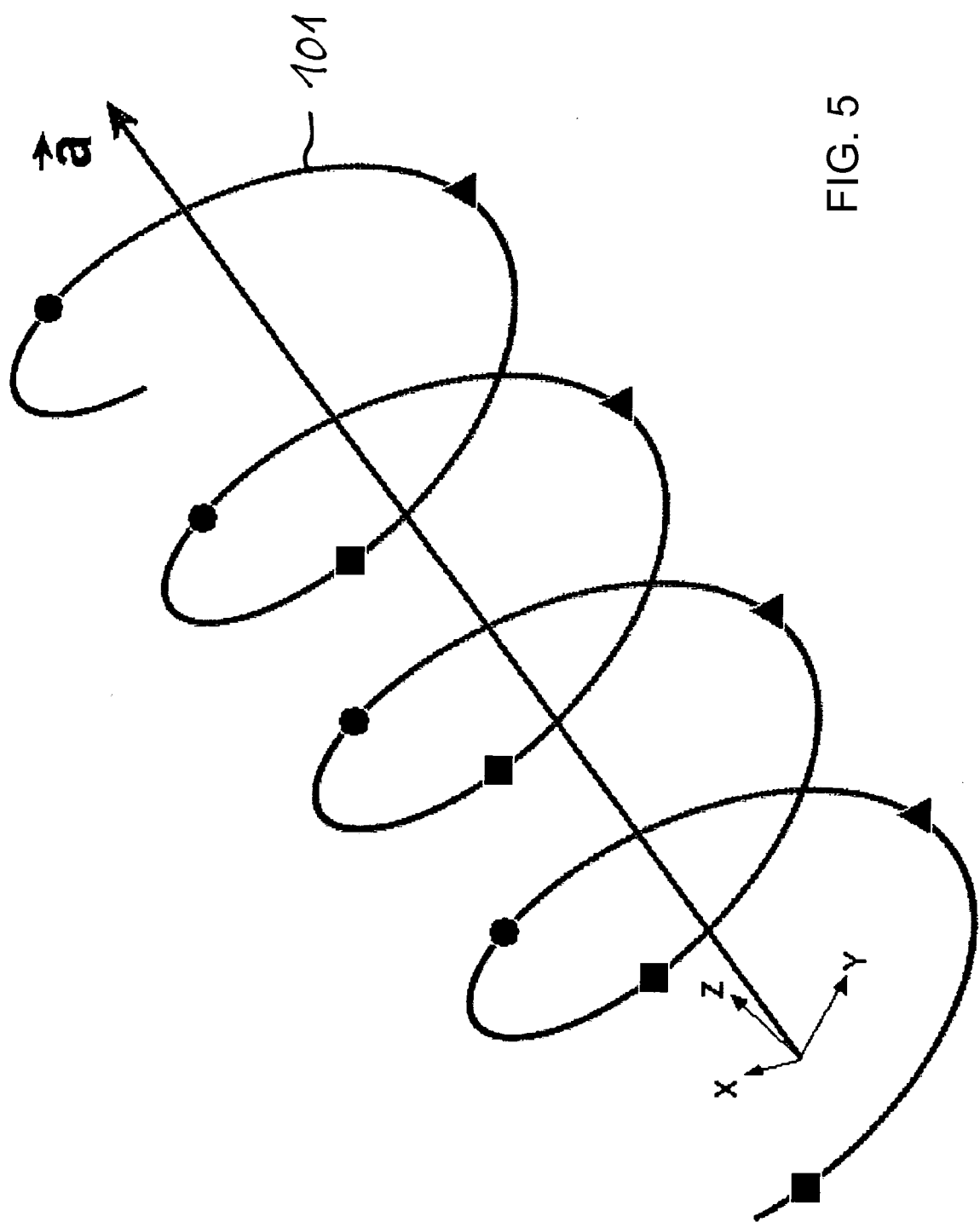
FIG. 5 shows a schematic of a scanning path configured as a helical track, extreme points that are used to calculate the maximum magnitude of the scanning speed being marked.

FIG. 5 shows a helical scanning track 101. Able to be seen in FIG. 5 are the cylinder axis (symmetry axis) on which the axis vector $\bar{a}$ lies, the Cartesian coordinate system X, Y, Z and the extreme points with reference to the three axes. Extreme points with reference to the X-axis are represented with small circles, extreme points with reference to the Y-axis are represented with small squares, and extreme points with reference to the Z axis are represented with small triangles. Four extreme points are represented with reference to each of the three axes, one each in each pitch of the helix. That is to say, a total of three extreme points are present and represented per pitch.

The extreme points are preferably formed in the same way, by forming the cross product of the axis vector $\bar{a}$ with the respective unit vector of the coordinate axis, or the result vector $\vec{rI}$ obtained from the cross product is used to determine the maximum scanning speed. Here, as also in the exemplary embodiment described above, the location of the extreme point need not be determined explicitly.

Figure 6:
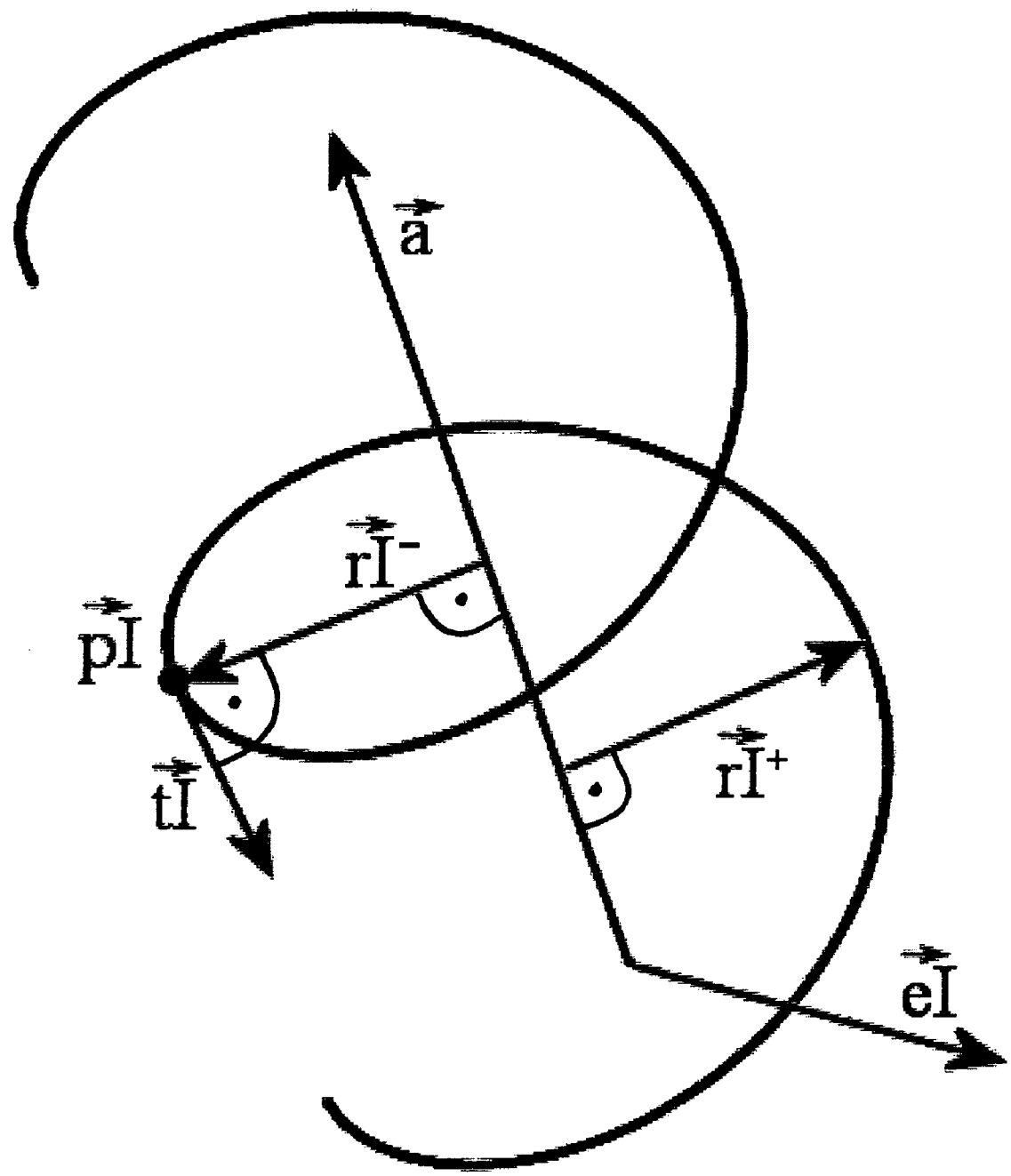
FIG. 6 shows a helical track in accordance with FIG. 5, with a schematic illustration of vectors that are used for the further calculation of the maximum scanning speed.

However, in addition to the three extreme points represented in FIG. 5 per helix pitch, there is also a consideration of three further extreme points per helix pitch, specifically one further extreme point in each case for each coordinate axis. On the other hand, it is sufficient to take account of the extreme points of a single helix pitch, since the ratios are repeated in each pitch. FIG. 6 shows the corresponding result vectors $\vec{rI}$ for one of the coordinate axes, the two result vectors differing in their direction, that is to say in their sign. Consequently, one of the two result vectors is marked with a plus sign and the other with a minus sign. The (not required) determination of the position can also be seen from FIG. 6 for one of the extreme points (on the left in the figure, where the tangent vector $\vec{tI}$ is applied). The vector $\vec{pI}$ which is collinear with the result vector or the direction vector $\vec{rI}$ and actually points from the symmetry axis (on which the axis vector runs) to the calculated extreme point is likewise illustrated in FIG. 6. The two result vectors with different signs are applied at different points of the axis vector $\vec{a}$ which are at a distance of half a pitch from one another. The two result vectors respectively enclose a right angle with the axis vector $\vec{a}$, as illustrated by an arc of angle with a point therein. It holds for the result vectors of all axes that:

$$\vec{rX^+} = \vec{a} \times (+\vec{eX})\ \vec{rX^-} = \vec{a} \times (-\vec{eX})$$

$$\vec{rY^+} = \vec{a} \times (+\vec{eY})\ \vec{rY^-} = \vec{a} \times (-\vec{eY})$$

$$\vec{rZ^+} = \vec{a} \times (+\vec{eZ})\ \vec{rZ^-} = \vec{a} \times (-\vec{eZ})$$

If the cross product between the unit vectors $\vec{eI}$ and the axis vector $\vec{a}$ vanishes, all the points on the cylinder track to be measured represent extreme points. In this case, the cylinder axis is parallel to the respective movement axis.

$$\vec{ei} \times \vec{a} = \vec{0} (\vec{a}\ \text{parellel}\ \vec{eI})\ \text{parallel to}$$

Alternatively, this can be established in turn by forming the scalar product (see above).

Figure 7:
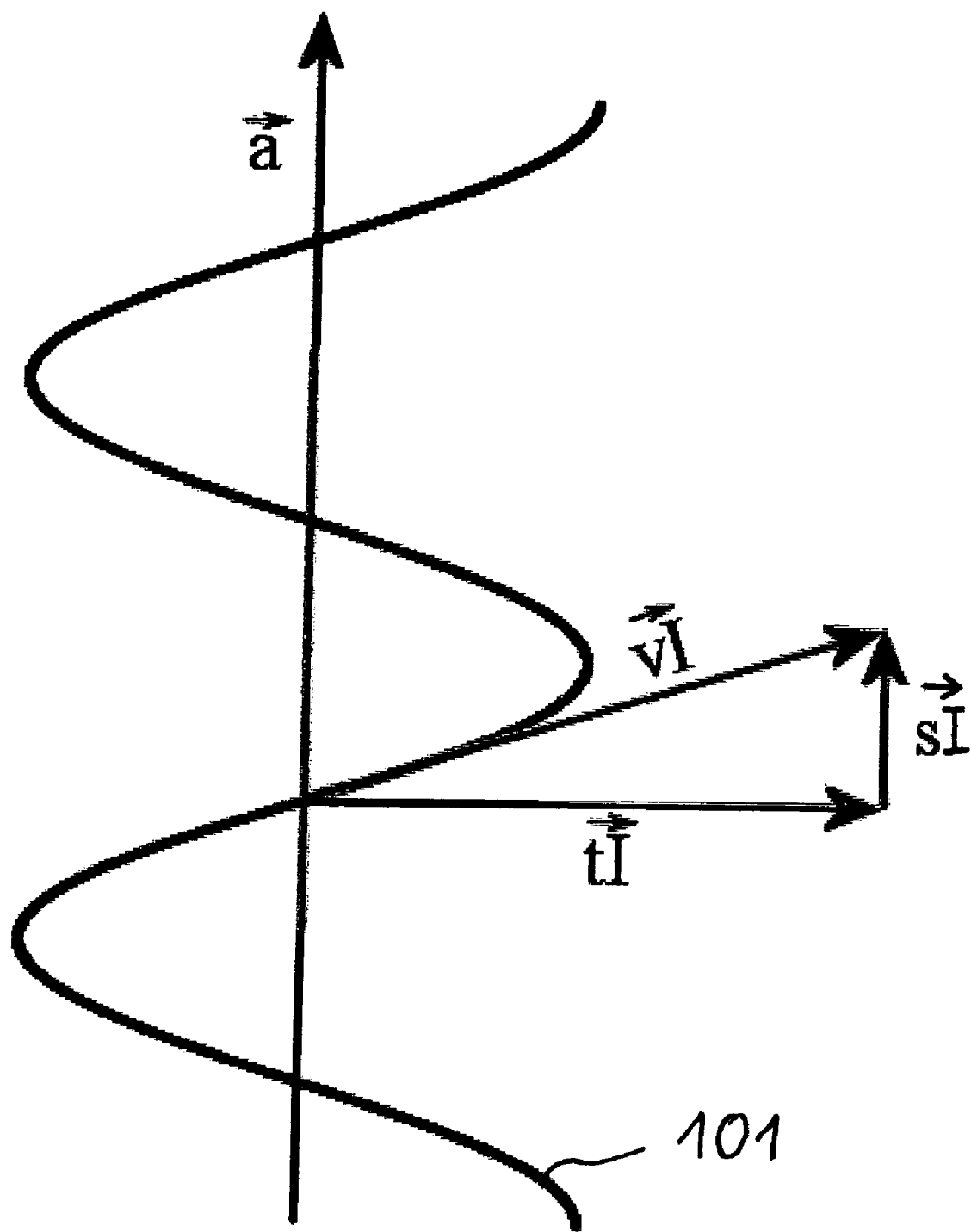
FIG. 7 shows an illustration showing the decomposition of a scanning speed vector in two components.

In the case of the cylinder track, the scanning speed $\vec{vI}$ can be split into a tangential component $\vec{tI}$ (which lies in a plane perpendicular to the cylinder axis) and into an axially parallel component $\vec{sI}$ (helix feed). This is illustrated in FIG. 7. Apart from the vector decomposition, FIG. 7 also shows the axis vector $\vec{a}$ and the helical scanning path 101 along the cylinder surface.

The axially parallel component $\vec{sI}$ is the same for all six extreme points. There is thus no need for indexing with I. The magnitudes of the vectors are normalized once again for determining the maximum scanning speed. The calculation of the two components of the scanning speed is described below.

The cross product between the axis vector $\vec{a}$ and the vector $\vec{rI}$ calculated in accordance with equation [1] yields the tangential component $\vec{tI}$ of the scanning speed $\vec{vI}$.

$$\vec{tI} = \vec{a} \times \vec{rI} \qquad [3]$$

This step of the method is therefore the same as in the case of the circular track. It therefore holds that:

$$\vec{tX^+} = \vec{a} \times \vec{rX^+}\ \vec{tX^-} = \vec{a} \times \vec{rX^-}$$

$$\vec{tY^+} = \vec{a} \times \vec{rY^+}\ \vec{tY^-} = \vec{a} \times \vec{rY^-}$$

$$\vec{tZ^+} = \vec{a} \times \vec{rZ^+}\ \vec{tZ^-} = \vec{a} \times \vec{rZ^-}$$

Apart from the vectors already mentioned, FIG. 6 also illustrates the tangential component $\vec{tI}$ of the scanning speed without the axially parallel component for one of the extreme points. For further calculations, the vectors $\vec{tI}$ are normalized such that $$|\vec{tI}| = 1.$$

All axially parallel components $\vec{sI}$ of the scanning speed $\vec{vI}$ have the same magnitude and the same direction and are identical to the axis vector $\vec{a}$. It holds for this reason that:

$$\vec{sI} = \vec{s} = \vec{a} \qquad [4]$$

For further calculations, the vector $\vec{s}$ of the axially parallel component (not indexed) of the scanning speed is normalized so that it holds that:

$$|\vec{s}| = 1.$$

The direction of the scanning speed $\vec{vI}$ is determined by the two vectors $\vec{tI}$ and $\vec{s}$, the number of revolutions n, the diameter D and the height h of the cylinder.

In order to take account of the pitch of the helix, the tangential component $\vec{tI}$ must be multiplied by the circumference $U = D \cdot \pi$ and the number of the revolutions n. Furthermore, the axially parallel component $\vec{s}$ must be multiplied by the height h of the cylinder.

The vector of the scanning speed $\vec{vI}$ is calculated by vector addition. It holds that:

$$\vec{vI} = \vec{tI} \cdot D \cdot \pi \cdot n + \vec{s} \cdot h \qquad [5]$$

For further calculations, the vector $\vec{vI}$ of the scanning speed is normalized, and so it holds that:

$$|\vec{vI}| = 1.$$

Reference should be made on this occasion to the analogy with the calculation in the case of the circular track: if the pitch h=0, it follows immediately that:

$$\vec{vI} = \vec{tI}.$$

Conversely, it follows that the further mode of procedure, already described above, for calculating the maximum scanning speed can be applied in the same way to the helix, although in this case use is made here of the scanning speed vector $\vec{vI}$ instead of the tangent vector $\vec{tI}$ in the case of the circular track. The description is therefore not repeated further at this juncture. All that remains to be taken into account further is that two extreme points are present with reference to each of the three coordinate axes.

A numerical example for the calculation of the maximum scanning speed is described below, once again for a scanning path in the shape of a helix. The symbols used are the same as those introduced above. The numerical example proceeds from the following geometry and position of the helix in the Cartesian coordinate system. The axis vector has the following coordinates:

$$\vec{a} = \begin{pmatrix} 0.2425 \\ 0 \\ 0.9701 \end{pmatrix}.$$

The diameter D of a cylinder whose surface surrounds the helix is 20 mm, the height h of the cylinder is 100 mm, and the pitch number of the helix, above this height, is 2.

The maximum magnitudes of the speeds of the three linear axes in the X-, Y- and Z-directions are respectively 300 mm/s.

It follows for the result vectors $\vec{rI}$ of the cross product from equation [1], which point to the extreme points, that:

$$r\vec{X}^+ = \vec{a} \times e\vec{X} = \begin{pmatrix} 0.2425 \\ 0 \\ 0.9701 \end{pmatrix} \times \begin{pmatrix} 1 \\ 0 \\ 0 \end{pmatrix} = \begin{pmatrix} 0 \\ 0.9701 \\ 0 \end{pmatrix}$$

$$r\vec{X}^- = \vec{a} \times -e\vec{X} = \begin{pmatrix} 0.2425 \\ 0 \\ 0.9701 \end{pmatrix} \times \begin{pmatrix} -1 \\ 0 \\ 0 \end{pmatrix} = \begin{pmatrix} 0 \\ -0.9701 \\ 0 \end{pmatrix}$$

$$r\vec{Y}^+ = \vec{a} \times e\vec{Y} = \begin{pmatrix} 0.2425 \\ 0 \\ 0.9701 \end{pmatrix} \times \begin{pmatrix} 0 \\ 1 \\ 0 \end{pmatrix} = \begin{pmatrix} -0.9701 \\ 0 \\ 0.2425 \end{pmatrix}$$

$$r\vec{Y}^- = \vec{a} \times -e\vec{Y} = \begin{pmatrix} 0.2425 \\ 0 \\ 0.9701 \end{pmatrix} \times \begin{pmatrix} 0 \\ -1 \\ 0 \end{pmatrix} = \begin{pmatrix} 0.9701 \\ 0 \\ -0.2425 \end{pmatrix}$$

$$r\vec{Z}^+ = \vec{a} \times e\vec{Z} = \begin{pmatrix} 0.2425 \\ 0 \\ 0.9701 \end{pmatrix} \times \begin{pmatrix} 0 \\ 0 \\ 1 \end{pmatrix} = \begin{pmatrix} 0 \\ -0.2425 \\ 0 \end{pmatrix}$$

$$r\vec{Z}^- = \vec{a} \times -e\vec{Z} = \begin{pmatrix} 0.2425 \\ 0 \\ 0.9701 \end{pmatrix} \times \begin{pmatrix} 0 \\ 0 \\ -1 \end{pmatrix} = \begin{pmatrix} 0 \\ 0.2425 \\ 0 \end{pmatrix}$$

For this, the results of the tangential components $\vec{tI}$, already normalized to one, of the scanning speed $\vec{vI}$ are as follows:

$$t\vec{X}^+ = \vec{a} \times r\vec{X}^+ = \begin{pmatrix} 0.2425 \\ 0 \\ 0.9701 \end{pmatrix} \times \begin{pmatrix} 0 \\ 0.9701 \\ 0 \end{pmatrix} = \begin{pmatrix} -0.9701 \\ 0 \\ 0.2425 \end{pmatrix}$$

$$t\vec{X}^- = \vec{a} \times r\vec{X}^- = \begin{pmatrix} 0.2425 \\ 0 \\ 0.9701 \end{pmatrix} \times \begin{pmatrix} 0 \\ -0.9701 \\ 0 \end{pmatrix} = \begin{pmatrix} 0.9701 \\ 0 \\ -0.2425 \end{pmatrix}$$

$$t\vec{Y}^+ = \vec{a} \times r\vec{Y}^+ = \begin{pmatrix} 0.2425 \\ 0 \\ 0.9701 \end{pmatrix} \times \begin{pmatrix} -0.9701 \\ 0 \\ 0.2425 \end{pmatrix} = \begin{pmatrix} 0 \\ -1 \\ 0 \end{pmatrix}$$

$$t\vec{Y}^- = \vec{a} \times r\vec{Y}^- = \begin{pmatrix} 0.2425 \\ 0 \\ 0.9701 \end{pmatrix} \times \begin{pmatrix} 0.9701 \\ 0 \\ -0.2425 \end{pmatrix} = \begin{pmatrix} 0 \\ 1 \\ 0 \end{pmatrix}$$

$$t\vec{Z}^+ = \vec{a} \times r\vec{Z}^+ = \begin{pmatrix} 0.2425 \\ 0 \\ 0.9701 \end{pmatrix} \times \begin{pmatrix} 0 \\ -0.2425 \\ 0 \end{pmatrix} = \begin{pmatrix} 0.9701 \\ 0 \\ -0.2425 \end{pmatrix}$$

$$t\vec{Z}^- = \vec{a} \times r\vec{Z}^- = \begin{pmatrix} 0.2425 \\ 0 \\ 0.9701 \end{pmatrix} \times \begin{pmatrix} 0 \\ 0.2425 \\ 0 \end{pmatrix} = \begin{pmatrix} -0.9701 \\ 0 \\ 0.2425 \end{pmatrix}$$

Since none of the cross products vanishes (that is to say is the zero vector), there is no need to consider a special case in which the symmetry axis is parallel to one of the unit vectors of the coordinate axes.

The axially parallel component of the scanning speed is calculated as:

$$\vec{sI} = \vec{s} = \vec{a} = \begin{pmatrix} 0.2425 \\ 0 \\ 0.9701 \end{pmatrix}$$

This yields the following speed vectors at the extreme points, these speed vectors, as well, being normalized to one:

$$v\vec{X}^+ = t\vec{X}^+ \cdot D \cdot \pi \cdot n + \vec{s} \cdot h$$
$$= \begin{pmatrix} -0.9701 \\ 0 \\ 0.2425 \end{pmatrix} \cdot 20\,mm \cdot \pi \cdot 2 + \begin{pmatrix} 0.2425 \\ 0 \\ 0.9701 \end{pmatrix} \cdot 100\,mm$$
$$= \begin{pmatrix} -0.6081 \\ 0 \\ 0.7939 \end{pmatrix}$$

$$v\vec{X}^- = t\vec{X}^- \cdot D \cdot \pi \cdot n + \vec{s} \cdot h$$
$$= \begin{pmatrix} 0.9701 \\ 0 \\ -0.2425 \end{pmatrix} \cdot 20\,mm \cdot \pi \cdot 2 + \begin{pmatrix} 0.2425 \\ 0 \\ 0.9701 \end{pmatrix} \cdot 100\,mm$$
$$= \begin{pmatrix} 0.9101 \\ 0 \\ 0.4143 \end{pmatrix}$$

$$v\vec{Y}^+ = t\vec{Y}^+ \cdot D \cdot \pi \cdot n + \vec{s} \cdot h$$
$$= \begin{pmatrix} 0 \\ -1 \\ 0 \end{pmatrix} \cdot 20\,mm \cdot \pi \cdot 2 + \begin{pmatrix} 0.2425 \\ 0 \\ 0.9701 \end{pmatrix} \cdot 100\,mm$$
$$= \begin{pmatrix} 0.1510 \\ -0.7825 \\ 0.6041 \end{pmatrix}$$

$$v\vec{Y}^- = t\vec{Y}^- \cdot D \cdot \pi \cdot n + \vec{s} \cdot h$$
$$= \begin{pmatrix} 0 \\ 1 \\ 0 \end{pmatrix} \cdot 20\,mm \cdot \pi \cdot 2 + \begin{pmatrix} 0.2425 \\ 0 \\ 0.9701 \end{pmatrix} \cdot 100\,mm$$
$$= \begin{pmatrix} 0.1510 \\ 0.7825 \\ 0.6041 \end{pmatrix}$$

$$v\vec{Z}^+ = t\vec{Z}^+ \cdot D \cdot \pi \cdot n + \vec{s} \cdot h$$
$$= \begin{pmatrix} 0.9701 \\ 0 \\ -0.2425 \end{pmatrix} \cdot 20\,mm \cdot \pi \cdot 2 + \begin{pmatrix} 0.2425 \\ 0 \\ 0.9701 \end{pmatrix} \cdot 100\,mm$$
$$= \begin{pmatrix} 0.1901 \\ 0 \\ 0.4143 \end{pmatrix}$$

-continued $$\vec{vZ}^- = \vec{tZ}^- \cdot D \cdot \pi \cdot n + \vec{s} \cdot h$$

$$= \begin{pmatrix} -0.9701 \\ 0 \\ 0.2425 \end{pmatrix} \cdot 20\,\text{mm} \cdot \pi \cdot 2 + \begin{pmatrix} 0.2425 \\ 0 \\ 0.9701 \end{pmatrix} \cdot 100\,\text{mm}$$

$$= \begin{pmatrix} -0.6081 \\ 0 \\ 0.7939 \end{pmatrix}$$

The relevant degrees of utilization resulting therefrom are:

$$\eta X = \max(|\vec{vX}_x^+|; |\vec{vX}_x^-|) = \max(|-0.6081|; |0.9101|) = 0.9101$$

$$\eta Y = \max(|\vec{vY}_x^+|; |\vec{vY}_x^-|) = \max(|-0.7825|; |0.0.7825|) = 0.7825$$

$$\eta Z = \max(|\vec{vZ}_x^+|; |\vec{vZ}_x^-|) = \max(|0.4143|; |0.0.7939|) = 0.7939$$

in which case the maximum of the evaluation components has already been formed for each of the coordinate axes X, Y, Z and the magnitude has been calculated.

The maximum scanning speeds for the individual coordinate axes are now calculated as:

$$vScanMax_x = \frac{1}{\eta X_x} vMax_x = \frac{1}{0.9101} 300\,\text{mm/s} = 329.6\,\text{mm/s}$$

$$vScanMax_y = \frac{1}{\eta X_y} vMax_y = \frac{1}{0.7825} 300\,\text{mm/s} = 383.4\,\text{mm/s}$$

$$vScanMax_z = \frac{1}{\eta X_z} vMax_z = \frac{1}{0.7939} 300\,\text{mm/s} = 377.9\,\text{mm/s}$$

and their minimum is formed:

vScanTrack=min (329.6 mm/s; 383.4 mm/s; 373.9 mm/s)=329.6 mm/s

The overall result of the maximum magnitude of the scanning speed is thus: 329.6 mm/s. It is limited by the speed at one of the two extreme points determined with reference to the X-axis.

The invention claimed is:

1. A method for scanning a work piece surface with an aid of a coordinate measuring machine, which comprises the steps of:
    bringing a probe element of the coordinate measuring machine into contact with the work piece surface, and moving the probe element along the work piece surface while contact is maintained;
    providing the coordinate measuring machine with a plurality of mutually independent degrees of freedom of possible movements of the probe element with reference to a work piece, and defining for the degrees of freedom maximum speed magnitudes that describe a maximum of a movement speed component of the probe element referred to as a respective degree of freedom;
    prescribing for a planned scanning of the work piece an estimated scanning path on which the probe element is to move during scanning, and in which an actual scanning path can differ from the estimated scanning path in dependence on actual measurements of the work piece; and
    determining a maximum magnitude of a scanning speed at which the estimated scanning path can be traversed at a constant magnitude of a speed of the probe element by taking account of the maximum speed magnitudes for the degrees of freedom.

2. The method according to claim 1, wherein:
    at least one of the degrees of freedom is a degree of freedom of a linear axis of the coordinate measuring machine;
    account is taken when determining the maximum magnitude of the scanning speed of extreme points on the estimated scanning path that have a local maximum of a derivative of a magnitude of a coordinate with respect to the estimated scanning path;
    the coordinate is a spatial coordinate that is defined with reference to a coordinate axis that is a linear axis or that runs parallel to the linear axis; and
    the maximum magnitude of the scanning speed is fixed such that a magnitude of a speed component with reference to the coordinate axis does not exceed a maximum speed magnitude of the degree of freedom at any of the extreme points determined.

3. The method according to claim 2, which further comprises:
    taking into account the extreme points for all the degrees of freedom;
    forming, for each of the extreme points, a tangent vector that runs in a direction of a tangent at the extreme point; and
    using, in each case only a component of a tangent vector being an evaluation component, to calculate the maximum magnitude of the scanning speed, which is defined with reference to the degree of freedom, for which the extreme point was determined.

4. The method according to claim 3, which further comprises normalizing all the tangent vectors to an equal magnitude, and determining the maximum magnitude of the scanning speed from the evaluation components.

5. The method according to claim 4, which further comprises determining, from the evaluation components of the normalized tangent vectors and the maximum speed magnitudes for the respective degrees of freedom, which of the maximum speed magnitudes of the degrees of freedom limits the maximum magnitude of the scanning speed.

6. The method according to claim 5, wherein magnitudes of all of the evaluation components of a same degree of freedom are formed, the reciprocal values of the magnitudes are respectively multiplied by the maximum speed magnitude of the assigned degree of freedom and a minimum of a multiplication results is used to determine the maximum magnitude of the scanning speed.

7. The method according to claim 1, wherein at least a portion of the estimated scanning path has a round profile.

8. The method according to claim 7, which further comprises:
    defining for the round profile, a rectilinear axis that is a rotational symmetry axis of the round profile or is a projection of the round profile on to a plane perpendicular to a rotational symmetry axis; and
    taking into account the extreme points by forming a cross product of a vector in a direction of the rotational symmetry axis with a vector in a direction of a linear axis.

9. The method according to claim 7, which further comprises selecting the round profile from the group consisting of a circular arc, a helix, a spiral, an ellipse, and an oval.

10. A coordinate measuring machine, comprising:
    a probe element for scanning a work piece surface, said probe element being configured to be brought into contact with the work piece surface and to be moved while the contact along the work piece surface is maintained;

a plurality of mutually independent degrees of freedom of possible movements of said probe element with reference to a work piece, and in which there are defined for the degrees of freedom maximum speed magnitudes that describe a maximum of a movement speed component of said probe element referred to a respective degree of freedom; and a speed determining device for evaluating a scanning path for a planned scanning of the work piece, in which said probe element is to move during scanning on the scanning path, in which an actual scanning path can differ from an estimated scanning path in dependence on actual measurements of the work piece, and said speed determining device is configured to determine, taking account of the maximum speed magnitudes for the various degrees of freedom, a maximum magnitude of the scanning speed at which the estimated scanning path can be traversed at a constant magnitude of the speed of said probe element.

11. The coordinated measuring machine according to claim 10, wherein said speed determining device is configured to execute a method for scanning a work piece surface, which comprises the steps of:

bringing a probe element of the coordinate measuring machine into contact with the work piece surface, and moving the probe element along the work piece surface while contact is maintained;

providing the coordinate measuring machine with a plurality of mutually independent degrees of freedom, of possible movements of the probe element with reference to a work piece, and defining for the degrees of freedom maximum speed magnitudes that describe a maximum of a movement speed component of the probe element referred to as a respective degree of freedom;

prescribing for a planned scanning of the work piece an estimated scanning path on which the probe element is to move during scanning, and in which an actual scanning path can differ from the estimated scanning path in dependence on actual measurements of the work piece;

determining a maximum magnitude of a scanning speed at which the estimated scanning path can be traversed at a constant magnitude of a speed of the probe element by taking account of the maximum speed magnitudes for the degrees of freedom;

providing at least one of the degrees of freedom as a degree of freedom of a linear axis of the coordinate measuring machine;

taking account when determining the maximum magnitude of the scanning speed of extreme points on the estimated scanning path that have a local maximum of a derivative of a magnitude of a coordinate with respect to the estimated scanning path;

providing the coordinate as a spatial coordinate that is defined with reference to a coordinate axis that is a linear axis or that runs parallel to the linear axis; and fixing the maximum magnitude of the scanning speed such that a magnitude of a speed component with reference to the coordinate axis does not exceed a maximum speed magnitude of the degree of freedom at any of the extreme points determined.

12. The coordinated measuring machine according to claim 11, wherein said speed determining device is configured to:

take into account the extreme points for all the degrees of freedom;

form, for each of the extreme points, a tangent vector that runs in a direction of a tangent at the extreme point; and use, in each case only a component of a tangent vector being an evaluation component, to calculate the maximum magnitude of the scanning speed, which is defined with reference to the degree of freedom, for which the extreme point was determined.

13. The coordinated measuring machine according to claim 12, wherein said speed determining device is configured to normalize all the tangent vectors to an equal magnitude, and determine the maximum magnitude of the scanning speed from the evaluation components.

14. The coordinated measuring machine according to claim 13, wherein said speed determining device is configured to determine, from the evaluation components of the normalized tangent vectors and the maximum speed magnitudes for the respective degrees of freedom, which of the maximum speed magnitudes of the degrees of freedom limits the maximum magnitude of the scanning speed.

15. The coordinated measuring machine according to claim 14, wherein said speed determining device is configured to form magnitudes of all of the evaluation components of a same degree of freedom, respectively multiply the reciprocal values of the magnitudes by the maximum speed magnitude of the assigned degree of freedom and use a minimum of multiplication results to determine the maximum magnitude of the scanning speed.

16. The coordinated measuring machine according to claim 10, wherein said speed determining device is configured to execute a method for scanning a work piece surface, which comprises the steps of:

bringing a probe element of the coordinate measuring machine into contact with the work piece surface, and moving the probe element along the work piece surface while contact is maintained;

providing the coordinate measuring machine with a plurality of mutually independent degrees of freedom of possible movements of the probe element with reference to a work piece, and defining for the degrees of freedom maximum speed magnitudes that describe a maximum of a movement speed component of the probe element referred to as a respective degree of freedom;

prescribing for a planned scanning of the work piece an estimated scanning path on which the probe element is to move during scanning, and in which an actual scanning path can differ from the estimated scanning path in dependence on actual measurements of the work piece;

determining a maximum magnitude of a scanning speed at which the estimated scanning path can be traversed at a constant magnitude of a speed of the probe element by taking account of the maximum speed magnitudes for the degrees of freedom; and providing at least a portion of the estimated scanning path with a round profile.

17. The coordinated measuring machine according to claim 16, wherein said speed determining device is configured to:

define for the round profile, a rectilinear axis that is a rotational symmetry axis of the round profile or is a projection of the round profile on to a plane perpendicular to a rotational symmetry axis; and take into account the extreme points by forming a cross product of a vector in a direction of the rotational symmetry axis with a vector in a direction of a linear axis.

18. The coordinated measuring machine according to claim 16, wherein said speed determining device is configured to select the round profile from the group consisting of a circular arc, a helix, a spiral, an ellipse, and an oval.

\* \* \* \* \*